(12) United States Patent
Schmuck et al.

(10) Patent No.: US 11,189,059 B2
(45) Date of Patent: Nov. 30, 2021

(54) OBJECT TRACKING FOR HEAD-MOUNTED DEVICES

(71) Applicant: Apple Inc., Cupertino, CA (US)

(72) Inventors: David A. Schmuck, Mountain View, CA (US); Marinus Meursing, Sunnyvale, CA (US); Brian S. Lau, Sacramento, CA (US); Jeremy C. Franklin, San Rafael, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/920,333

(22) Filed: Jul. 2, 2020

(65) Prior Publication Data
US 2021/0019919 A1 Jan. 21, 2021

Related U.S. Application Data

(60) Provisional application No. 62/875,410, filed on Jul. 17, 2019.

(51) Int. Cl.
*G06T 11/00* (2006.01)
*G06K 9/00* (2006.01)
*G06T 7/73* (2017.01)

(52) U.S. Cl.
CPC .......... *G06T 11/00* (2013.01); *G06K 9/00664* (2013.01); *G06T 7/73* (2017.01); *G06T 2207/30204* (2013.01)

(58) Field of Classification Search
CPC . G06T 11/00; G06T 7/73; G06T 2207/30204; G06T 7/251; G06K 9/00664; G06K 9/00671; A63F 13/245; A63F 13/211; A63F 13/213; A63F 13/212; G06F 3/01; G06F 3/011; G06F 3/016
See application file for complete search history.

(56) References Cited

U.S. PATENT DOCUMENTS

| | | | |
|---|---|---|---|
| 2008/0015017 A1* | 1/2008 | Ashida | A63F 13/235 463/37 |
| 2010/0079356 A1* | 4/2010 | Hoellwarth | G06F 3/041 345/8 |
| 2013/0286004 A1 | 10/2013 | McCulloch | |
| 2014/0052555 A1 | 2/2014 | MacIntosh | |
| 2016/0334628 A1* | 11/2016 | Lyons | G02B 27/022 |

(Continued)

*Primary Examiner* — Maurice L. Mcdowell, Jr.
(74) *Attorney, Agent, or Firm* — Morgan, Lewis & Bockius LLP

(57) ABSTRACT

A head-mounted device can be operated with another device and/or object for which information is gathered to facilitate visual display of a representation thereof. An object can be provided with indicators that allow a head-mounted device to determine both an identity and a characteristic (e.g., position, orientation, distance, etc.) of the object. Additionally or alternatively, the head-mounted device can determine both an identity and a characteristic (e.g., position, orientation, distance, etc.) of an electronic device attached to an object for producing a virtual representation of the object. Additionally or alternatively, the head-mounted device can receive data from an electronic device attached to an object for producing a virtual representation of the object. The virtual representation of the object can resemble the physical object, even where the object itself is not independently analyzed.

19 Claims, 7 Drawing Sheets

(56) References Cited

U.S. PATENT DOCUMENTS

| | | | |
|---|---|---|---|
| 2016/0378204 A1* | 12/2016 | Chen | G06K 9/00671 |
| | | | 345/156 |
| 2017/0185160 A1* | 6/2017 | Cho | G06F 3/011 |
| 2017/0262045 A1* | 9/2017 | Rouvinez | G06F 3/011 |
| 2018/0074599 A1* | 3/2018 | Garcia | G02B 27/0176 |
| 2018/0197336 A1* | 7/2018 | Rochford | G06T 19/006 |
| 2019/0179426 A1* | 6/2019 | Ojala | G06F 3/011 |
| 2019/0228584 A1* | 7/2019 | Balan | G06F 3/0325 |
| 2019/0302898 A1* | 10/2019 | Holverson | G06F 3/0304 |
| 2020/0117336 A1* | 4/2020 | Mani | G06F 3/0304 |
| 2020/0387215 A1* | 12/2020 | Smathers | G06T 19/006 |

\* cited by examiner

OBJECT TRACKING FOR HEAD-MOUNTED DEVICES

CROSS-REFERENCE TO RELATED APPLICATION

This application claims the benefit of U.S. Provisional Application No. 62/875,410, entitled "OBJECT TRACKING FOR HEAD-MOUNTED DEVICES," filed Jul. 17, 2019, the entirety of which is incorporated herein by reference.

TECHNICAL FIELD

The present description relates generally to head-mounted devices, and, more particularly, to object tracking for head-mounted devices.

BACKGROUND

A head-mounted device can be worn by a user to display visual information within the field of view of the user. The head-mounted device can be used as a virtual reality (VR) system, an augmented reality (AR) system, and/or a mixed reality (MR) system. A user may observe outputs provided by the head-mounted device, such as visual information provided on a display. The display can optionally allow a user to observe an environment outside of the head-mounted device. Other outputs provided by the head-mounted device can include audio output and/or haptic feedback. A user may further interact with the head-mounted device by providing inputs for processing by one or more components of the head-mounted device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
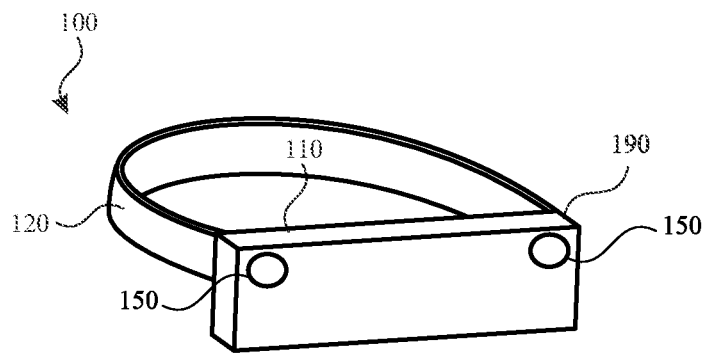
FIG. 1 illustrates a perspective view of a head-mounted device, in accordance with some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mounted devices, such as head-mounted displays, headsets, visors, smartglasses, head-up display, etc., can perform a range of functions that are managed by the components (e.g., sensors, circuitry, and other hardware) included with the wearable device.

Head-mounted devices can be equipped with a wide range of outward and inward facing sensors. These sensors can recognize and track objects, surfaces, and user gestures such as hand and body movements. The functionality of such sensors can be limited by factors such as component cost, device size, device weight, heat generation, available computing power, and/or occlusion due to the device being in a specific location relative to other objects or users.

Head-mounted devices can collect data from and/or relating to a device and make certain determinations that aid the process of displaying a representation (e.g., virtual rendering) to the user. For example, an object can be provided with indicators that allow a head-mounted device to determine both an identity and a characteristic (e.g., position, orientation, distance, etc.) of the object. Accordingly, the same indicators can be used to determine the information necessary to produce a virtual representation of the object in a manner that resembles the physical object.

By further example, an electronic device that is recognizable by a head-mounted device can be attached to another object in a manner that maintains a fixed relative position and orientation between the electronic device and the object. The head-mounted device can determine both an identity and a characteristic (e.g., position, orientation, distance, etc.) of the electronic device. The information regarding the electronic device can be used to produce a virtual representation of the object in a manner that resembles the physical object.

By further example, an electronic device can be attached to another object and collect data that is transmitted to the head-mounted device for analysis. The head-mounted device can determine both an identity and a characteristic (e.g., position, orientation, distance, etc.) of the electronic device based on the data. The information received from the electronic device can be used to produce a virtual representation of the object in a manner that resembles the physical object.

Rather than requiring a head-mounted device to identify and analyze each object independently, analysis of an electronic device can provide sufficient constraints to determine characteristics of another object, without requiring that the other object be independently analyzed. With such analysis, the speed and accuracy of object recognition, hand and body tracking, surface mapping, and/or digital reconstruction can be improved. By further example, this an approach can provide more effective and efficient mapping of space, surfaces, objects, gestures and users.

These and other embodiments are discussed below with reference to FIGS. 1-13. However, those skilled in the art will readily appreciate that the detailed description given herein with respect to these Figures is for explanatory purposes only and should not be construed as limiting.

According to some embodiments, for example as shown in FIG. 1, a head-mounted device 100 includes a frame 190 that is worn on a head of a user. The frame 190 can be positioned in front of the eyes of a user to provide information within a field of view of the user. The frame 190 can provide nose pads or another feature to rest on a user's nose. The frame 190 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mounted device 100 to a user's head. For example, one or more bands, straps, belts, caps, hats, or other components can be used in addition to or in place of the illustrated components of the head-mounted device 100. By further example, the securement element 120 can include multiple components to engage a user's head.

The frame 190 can provide structure around a peripheral region thereof to support any internal components of the frame 190 in their assembled position. For example, the frame 190 can enclose and support various internal components (including for example integrated circuit chips, processors, memory devices and other circuitry) to provide computing and functional operations for the head-mounted device 100, as discussed further herein. Any number of components can be included within and/or on the frame 190 and/or the securement element 120 and be operably connected to each other.

The frame 190 can include and/or support one or more cameras 150. The cameras 150 can be positioned on or near an outer side of the frame 190 to capture images of views external to the head-mounted device 100. The captured images can be used for display to the user or stored for any other purpose. Additionally or alternatively, other sensors, input devices, and/or output devices can be positioned at or on an exterior side of the frame 190.

Figure 2:
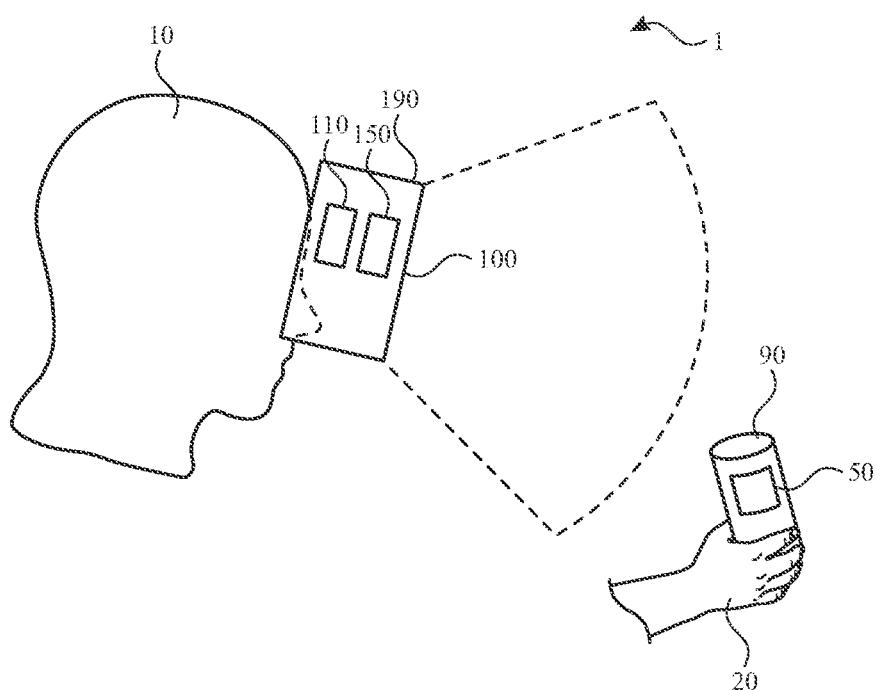
FIG. 2 illustrates a view of a head-mounted device, a personal device, and an electronic device, in accordance with some embodiments of the present disclosure.

Referring now to FIG. 2, the head-mounted device 100 of a system 1 can be used in conjunction with an object 90 and/or an electronic device 50. Optionally, operations thereof can be conducted while the user operates the object 90 and/or an electronic device 50, for example with a hand 20 of the user.

The head-mounted device 100 can operate the camera 150 in a manner that captures one or more views of the object 90, the electronic device 50, and/or the hand 20 within a field of view of the camera 150. The captured images can be produced on the display 110 of the head-mounted device 100 for observation by the user 10. As used herein, a camera is a device that can optically capture a view of an environment (e.g., within and/or outside the visible spectrum of light). Additionally or alternatively, the head-mounted device 100 can communicate with the object 90 and/or the electronic device 50. The head-mounted device 100 can provide one or more outputs to the user based on information gathered relating to the object 90, the electronic device 50, and/or the hand 20. The user can observe the object 90, the electronic device 50, the hand 20, and/or representations thereof through the display 110 of the head-mounted device 100, as discussed further herein.

The display 110 can optionally transmit light from a physical environment for viewing by the user. Such a display 110 can include optical properties, such lenses for vision correction based on incoming light from the physical environment. Additionally or alternatively, the display 110 can provide information as a display within a field of view of the user. Such information can be provided to the exclusion of a view of a physical environment or in addition to (e.g., overlaid with) a physical environment. Additionally or alternatively, other sensors, input devices, and/or output devices can be positioned at or on an interior side of the frame 190.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 3:
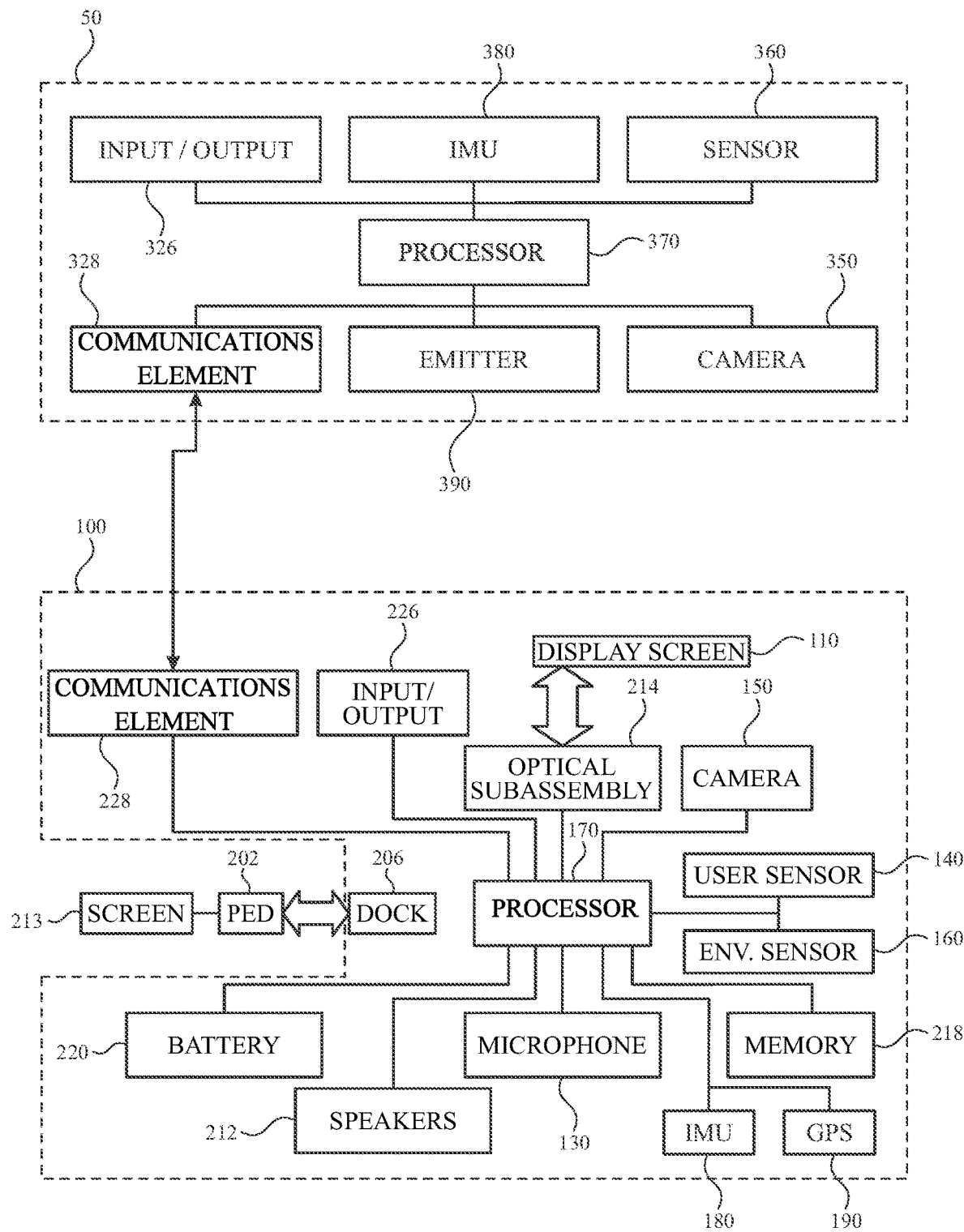
FIG. 3 illustrates a block diagram of a head-mounted device and an electronic device, in accordance with some embodiments of the present disclosure.

Referring now to FIG. 3, components of the electronic device and the head-mounted device can be provided and operatively connected to achieve the performance described herein. FIG. 3 shows a simplified block diagram of a head-mounted device 100 in accordance with one or more embodiments of the disclosure. It will be appreciated that components described herein can be provided on either or both of a frame and/or a securement element of the head-mounted device 100.

As shown in FIG. 3, the head-mounted device 100 can include a processor 170 with one or more processing units that include or are configured to access a memory 218 having instructions stored thereon. The instructions or computer programs may be configured to perform one or more of the operations or functions described with respect to the head-mounted device 100. The processor 170 can be implemented as any electronic device capable of processing, receiving, or transmitting data or instructions. For example, the processor 170 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 218 can store electronic data that can be used by the head-mounted device 100. For example, the memory 218 can store electrical data or content such as, for example, audio and video files, documents and applications, device settings and user preferences, timing and control signals or data for the various modules, data structures or databases, and so on. The memory 218 can be configured as any type of memory. By way of example only, the memory 218 can be implemented as random access memory, read-only memory, Flash memory, removable memory, or other types of storage elements, or combinations of such devices.

The head-mounted device 100 can further include a display 110 for displaying visual information for a user. The display 110 can provide visual (e.g., image or video) output. The display 110 can be or include an opaque, transparent, and/or translucent display. The display 110 may have a transparent or translucent medium through which light representative of images is directed to a user's eyes. The display 110 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mounted device 100 can include an optical subassembly 214 configured to help optically adjust and correctly project the image based content being displayed by the display 110 for close up viewing. The optical subassembly 214 can include one or more lenses, mirrors, or other optical devices.

The head-mounted device 100 can include the camera 150 for capturing a view of an environment external to the head-mounted device 100. The camera 150 can include an optical sensor, such as a photodiode or a photodiode array. Additionally or alternatively, the camera 150 can include one or more of various types of optical sensors that are arranged in various configurations for detecting user inputs described herein. The camera 150 may be configured to capture an image of a scene or subject located within a field of view of the camera 150. The image may be stored in a digital file in accordance with any one of a number of digital formats. In some embodiments, the head-mounted device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The camera 150 can provide one or more windows (e.g., opening, transmission medium, and/or lens) to transmit light for image capture and/or detection. The window can include a light transmitting material. The window can provide optical effects for the transmitted light. For example, the window can include one or more optical components disposed relative to an image sensor, including, for example, a lens, a diffuser, a filter, a shutter, and the like. It will also be understood that the head-mounted device 100 can include any number of cameras. The cameras can be positioned and oriented to capture different views. For example, one camera can capture an image of an object from one perspective and another camera can capture an image of an object from another perspective. Additionally or alternatively, the other camera can capture an image of an object that is not captured by the first camera.

Additionally or alternatively, the head-mounted device 100 can include one or more environment sensors 160 that are directed to an external environment. Such environment sensors 160 can include any sensor that detects one or more conditions in an environment of the head-mounted device 100. For example, an environment sensor 160 can include an imaging device, a thermal sensor, a proximity sensor, a motion sensor, a humidity sensor, a chemical sensor, a light sensor, and/or a UV sensor. An environment sensor 160 can be configured to sense substantially any type of characteristic such as, but not limited to, images, pressure, light, touch, force, temperature, position, motion, and so on. For example, the environment sensor 160 may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment.

The head-mounted device 100 can include an inertial measurement unit ("IMU") 180 that provides information regarding a characteristic of the head-mounted device 100, such as inertial angles thereof. For example, the IMU 180 can include a six-degrees of freedom IMU that calculates the head-mounted device's position, velocity, and/or acceleration based on six degrees of freedom (x, y, z, $\theta_x$, $\theta_y$, and $\theta_z$). The IMU 180 can include one or more of an accelerometer, a gyroscope, and/or a magnetometer. Additionally or alternatively, the head-mounted device 100 can detect motion characteristics of the head-mounted device 100 with one or more other motion sensors, such as an accelerometer, a gyroscope, a global positioning sensor, a tilt sensor, and so on for detecting movement and acceleration of the head-mounted device 100. The IMU 180 can provide data to the processor 170 for processing.

The head-mounted device 100 can include one or more user sensors 140 for tracking features of the user wearing the head-mounted device 100. For example, a user sensor 140 can perform facial feature detection, facial movement detection, facial recognition, eye tracking, user mood detection, user emotion detection, voice detection, etc. Such eye tracking may be used to determine a location of information to be displayed on the display 110 and/or a portion (e.g., object) of a view to be analyzed by the head-mounted device 100. By further example, the user sensor 140 can be a bio-sensor for tracking biometric characteristics, such as health and activity metrics. The user sensor 140 can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

The head-mounted device 100 can include a battery 220, which can charge and/or power components of the head-mounted device 100. The battery 220 can also charge and/or power components connected to the head-mounted device 100, such as a portable electronic device 202, as discussed further herein.

The head-mounted device 100 can include an input/output component 226, which can include any suitable component for allowing a user to provide input and/or receive output. The input/output component 226 can include, for example, one or more buttons, crowns, keys, dials, trackpads, microphones, haptic devices, and the like. Additionally or alternatively, the input/output component 226 can include any suitable component for connecting the head-mounted device 100 to other devices. Suitable components can include, for example, audio/video jacks, data connectors, or any additional or alternative input/output components.

The head-mounted device 100 can include a communication element 228 for communicating with one or more servers or other devices using any suitable communications protocol. For example, communication element 228 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communication element 228 can also include an antenna for transmitting and receiving electromagnetic signals.

The head-mounted device 100 can include the microphone 230 as described herein. The microphone 230 can be operably connected to the processor 170 for detection of sound levels and communication of detections for further processing, as described further herein.

The head-mounted device 100 can include the speakers 222 as described herein. The speakers 222 can be operably connected to the processor 170 for control of speaker output, including sound levels, as described further herein.

The head-mounted device 100 can optionally connect to a portable electronic device 202, which can provide certain functions. For the sake of brevity, the portable electronic device 202 will not be described in detail in FIG. 3. It should be appreciated, however, that the portable electronic device 202 may be embodied in a variety of forms including a variety of features, all or some of which can be utilized by the head-mounted device 100 (e.g., input/output, controls, processing, battery, etc.). The portable electronic device 202 can provide a handheld form factor (e.g., small portable electronic device that is lightweight, fits in a pocket, etc.). Although not limited to these, examples include media players, phones (including smart phones), PDAs, computers, and the like. The portable electronic device 202 may include a screen 213 for presenting the graphical portion of the media to the user. The screen 213 can be utilized as the primary screen of the head-mounted device 100.

The head-mounted device 100 can include a dock 206 operative to receive the portable electronic device 202. The dock 206 can include a connector (e.g., Lightning, USB, FireWire, power, DVI, etc.), which can be plugged into a complementary connector of the portable electronic device 202. The dock 206 may include features for helping to align the connectors during engagement and for physically coupling the portable electronic device 202 to the head-mounted device 100. For example, the dock 206 may define a cavity for placement of the portable electronic device 202. The dock 206 may also include retaining features for securing portable electronic device 202 within the cavity. The connector on the dock 206 can function as a communication interface between the portable electronic device 202 and the head-mounted device 100.

FIG. 3 also shows a simplified block diagram of an electronic device 50 in accordance with one or more embodiments of the disclosure.

As shown in FIG. 3, the electronic device 50 can include a processor 370 with one or more processing units that include or are configured to access a memory having instructions stored thereon. The instructions or computer programs may be configured to perform one or more of the operations or functions described with respect to the electronic device 50. The processor 370 can be implemented as any electronic device capable of processing, receiving, or transmitting data or instructions. For example, the processor 370 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The electronic device 50 can include an input/output component 326, which can include any suitable component for allowing a user to provide input and/or receive output. The input/output component 326 can include, for example, one or more buttons, crowns, keys, dials, trackpads, microphones, touchscreens, haptic devices, and the like. Additionally or alternatively, the input/output component 326 can include any suitable component for connecting the electronic device 50 to other devices. Suitable components can include, for example, audio/video jacks, data connectors, or any additional or alternative input/output components.

The electronic device 50 can include an inertial measurement unit ("IMU") 380 that provides information regarding a characteristic of the electronic device 50, such as inertial angles thereof. For example, the IMU 380 can include a six-degrees of freedom IMU that calculates the electronic device's position, velocity, and/or acceleration based on six degrees of freedom (x, y, z, $\theta_x$, $\theta_y$, and $\theta_z$). The IMU 380 can include one or more of an accelerometer, a gyroscope, and/or a magnetometer. Additionally or alternatively, the electronic device 50 can detect motion characteristics of the electronic device 50 with one or more other motion sensors, such as an accelerometer, a gyroscope, a global positioning sensor, a tilt sensor, and so on for detecting movement and acceleration of the electronic device 50. The IMU 380 can provide data to the processor 370 for processing.

Additionally or alternatively, the electronic device 50 can include one or more environment sensors 360 that are directed to an external environment. Such environment sensors 360 can include any sensor that detects one or more conditions in an environment of the electronic device 50. For example, an environment sensor 360 can include an imaging device, a thermal sensor, a proximity sensor, a motion sensor, a humidity sensor, a chemical sensor, a light sensor, an audio sensor (e.g., microphone), and/or a UV sensor. An environment sensor 360 can be configured to sense substantially any type of characteristic such as, but not limited to, images, pressure, light, touch, force, temperature, position, motion, sound, and so on. For example, the environment sensor 360 may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment.

The electronic device 50 can include a camera 350 for capturing a view of an environment external to the electronic device 50. The camera 350 can include an optical sensor, such as a photodiode or a photodiode array. Additionally or alternatively, the camera 350 can include one or more of various types of optical sensors that are arranged in various configurations for detecting user inputs described herein. The camera 350 may be configured to capture an image of a scene or subject located within a field of view of the camera 350. The image may be stored in a digital file in accordance with any one of a number of digital formats. In some embodiments, the electronic device 50 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The electronic device 50 can include an emitter 390 for emitting an output that is detectable by the head-mounted device 100. The emitter can produce an output, such as light, sound, electromagnetic radiation, and the like. The head-mounted device 100 can detect the output of the emitter 390 (e.g., with the environment sensor 160) to determine a characteristic thereof and of the electronic device 50, as discussed further herein.

The electronic device 50 can include a communication element 328 for communicating with one or more servers or other devices, such as the head-mounted device 100 via the communication element 228, using any suitable communications protocol. For example, communication element 328 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communication element 328 can also include an antenna for transmitting and receiving electromagnetic signals.

Figure 4:
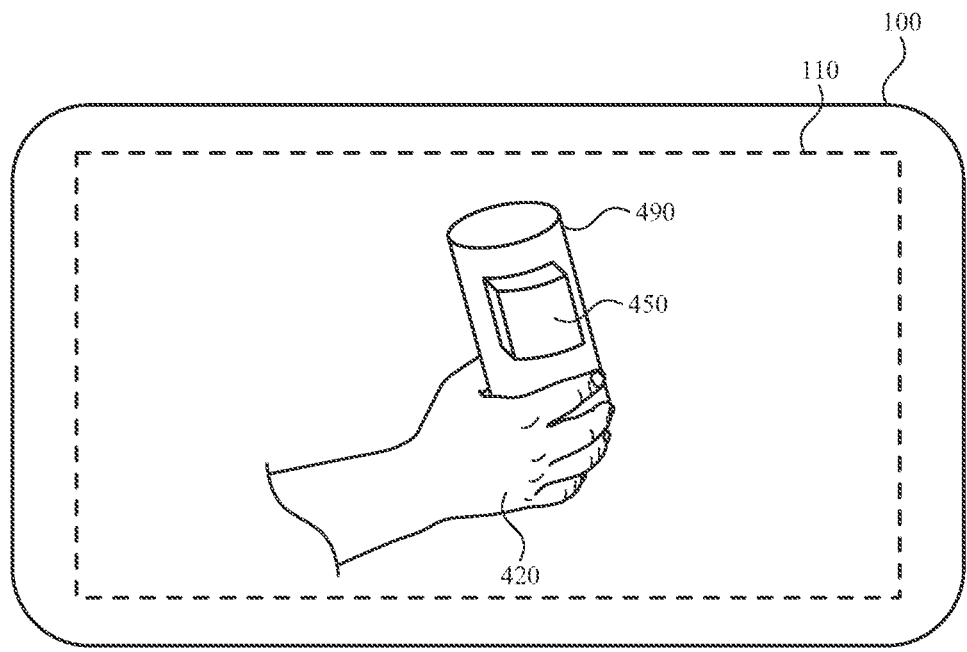
FIG. 4 illustrates a display of a head-mounted device providing a representation of a personal device, in accordance with some embodiments of the present disclosure.

Referring now to FIG. 4, the display 110 of the head-mounted device 100 can provide a view of the object 490, electronic device 450, and/or a user's hand 420 or other portion of the user. One or more of the objects provided in the view of the display 110 can correspond to physical objects in an environment. For example, a camera of the head-mounted device 100 can capture a view of the object, the electronic device, and/or the hand of the user. Based on the captured view, the display 110 can provide a display that includes images of the physical objects.

Additionally or alternatively, the display 110 can provide a display of virtual objects that correspond to physical objects in the external environment. For example, the object 490, the electronic device 450, and/or the hands 420 can be rendered as virtual objects having features (e.g., position, orientation, color, size, etc.) that are based on detections of the physical objects in the external environment. As such, the virtual representations can facilitate a user's physical interactions with the corresponding physical objects in the external environment. Accordingly, the user can physically interact with physical objects that are virtually represented.

Additionally or alternatively, the display 110 can provide a display of virtual objects that do not correspond to physical objects in the external environment. For example, the object 490 and/or the electronic device 450 can be rendered as virtual objects even when no corresponding object is physically present in the external environment. By further example, a virtual object can be displayed by the display 110 as if extending from another object. Such a virtual object can be observable only through the display 110. It will be recognized that the view can include a view of physical objects and virtual objects.

Additionally or alternatively, one or more physical objects in the external environment can be omitted from representation on the display 110. For example, the object 490 can be virtually represented on the display 110, but the electronic device 450 can be omitted, such that only the object 490 is displayed. The corresponding electronic device can nonetheless be operated and analyzed by the head-mounted device to facilitate representation of the object 490.

One or more of the displayed items (e.g., the hands 420) or portions thereof can be displayed with features that facilitate visibility thereof as well as visibility of other objects. For example, the hands 420 can be displayed (e.g., rendered) as semi-transparent (e.g., semi-opaque), such that portions of the object 490 and/or the electronic device 450 can be viewed through the hands 420. Additionally or alternatively, portions of the hands 420 can be fully transparent, while other portions can be at least partially opaque, so that the transparent portions provide a view to underlying objects (e.g., object 490 and/or the electronic device 450). The object 490 and/or the electronic device 450 can be provided with highlighting, glowing, outlines, shadows, or other contrasting features that allow portions thereof to be more distinctly visible through the hands 420.

Figure 5:
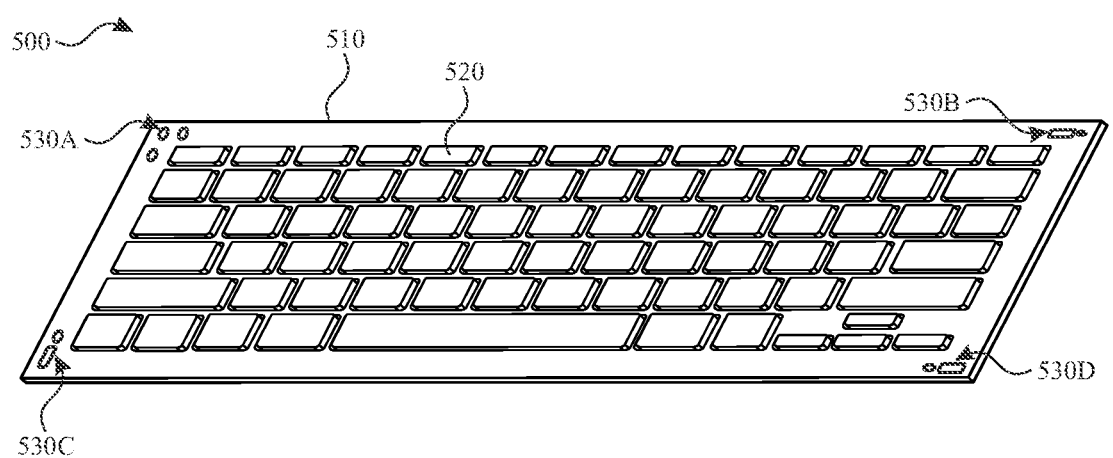
FIG. 5 illustrates a perspective view of an object with indicators, in accordance with some embodiments of the present disclosure.

Referring now to FIG. 5, an object can be provided with one or more indicators to facilitate both identification of the object and determination of a characteristic thereof by a head-mounted device. The object 500 of FIG. 5 can correspond to the object 90 of FIGS. 2 and 3 and/or the electronic device 50 of FIGS. 2 and 3. Additionally or alternatively, the object 500 of FIG. 5 can be represented visually by the head-mounted device 100 as the object 490 and/or the electronic device 450 of FIG. 4.

The object 500 can include any object that is detectable by a head-mounted device and capable of being represented (e.g., visually) by the head-mounted device. For example, the object 500 can be an input device for operation by a user. While the object 500 is shown as a keyboard, it will be understood that other types of input devices are contemplated, such as number pads, phone dial pads, security code entry pads, custom key pads, and the like. Yet other types of input devices include a trackpad, a mouse, a trackball, a game controller, a remote control, and the like. Additionally or alternatively, the object 500 can be an electronic device. For example, the object 500 can be a phone, a tablet computing device, a mobile computing device, a watch, a laptop computing device, a stylus, a digital media player, wearable device (clothing, gloves, shoes, jewelry, apparel, and the like), a display, a television, and the like. Additionally or alternatively, the object 500 can be any object in an external environment for representation by the head-mounted device in a virtual environment.

The object 500 can include a housing 510 that defines at least a portion of an outer periphery of the object 500. The housing 510 can support internal components of the object 500 while providing an outer surface that is visible to an observer. The housing 510 can include a shape, color, and/or texture that is visually and/or tactilely detectable by a user. The object 500 can further include one or more input members 520, such as keys and/or touchpads. A user can operate the input members 520 during operation of the object 500.

The object 500 can include one or more indicators for identifying itself to a head-mounted device. As shown in FIG. 5, indicators 530a, 530b, 530c, and/or 530d can be provided at different regions of the object 500. While one type of indicator is illustrated, it will be recognized that various kinds of indicators can be employed. For example, indicators can include patterns, symbols, text (alpha and/or numeric), images, barcodes (e.g., Universal Product Code), QR codes, and the like. Such indicators may be formed as patterns of contrasting dark (e.g., black) and light (e.g., white) portions. It will be understood that such symbols can be provided within or outside the visible spectrum of the human eye. Where the indicators reflect light outside of the visible spectrum, it can be non-visible to a user. For example, the indicators can include ultraviolet-reflective ink and/or infrared-reflective ink. As such, the indicators can provide identification capabilities without being noticeable by a user.

Such indicators can be arranged in a manner that is detectable by a head-mounted device. Furthermore, the arrangement of the indicators can be recognizable by the head-mounted device as corresponding to a particular type of object. As such, one arrangement on a given type of object (e.g., make, model, style, etc.) can be different from a different arrangement of indicators on a different type of object. Accordingly, the arrangement can be used as an identifier to allow a head-mounted device to identify the object 500 as one of a type. Information regarding the type of object can then be retrieved and applied by the head-mounted device, for example for visual representation thereof. Such information can relate to static features of the object, such as size, shape, color, and the like. It will be appreciated that a static feature is one that does not change during operation of the corresponding device.

The same indicators can be recognizable by the head-mounted device to determine a characteristic of the object. For example, the indicators can be used to determine dynamic characteristics of the object, such as position, orientation, distance from the head-mounted device, configuration, state, and the like. It will be understood that such dynamic characteristics can change over time. As such, it can be useful to determine such characteristics so that information relating to the identity of the object 500 can be applied in a manner that facilitates accurate representation (e.g., virtual rendering) of the object by the head-mounted device. Such representation can be updated repeatedly, periodically, or constantly based on updated detections of the indicators.

As shown in FIG. 5, each of the indicators (e.g., indicators 530a, 530b, 530c, and 530d) can be different from another one of the indicators. For example, at least some of the indicators (e.g., indicators 530a, 530b, 530c, and 530d) can have a unique or different size, shape, color, and/or the like. By further example, at least some of the indicators (e.g., indicators 530a, 530b, 530c, and 530d) can have a same or similar shape in a unique or different orientation relative to each other.

Where each of the indicators is located at a known portion of the object 500 (e.g., on the housing 510), a head-mounted device can identify the location and/or orientation of each indicator to determine the location of the corresponding portion within a field of view of the head-mounted device. The relative spatial relationships of the indicators within the field of view can also facilitate determination of the orientation of the object 500 relative to the head-mounted device. The relative positions of the indicators within the field of view can also facilitate determination of a distance between the object 500 and the head-mounted device. When a distance is known, the head-mounted device can also infer that other objects near the object 500 are positioned at a similar distance.

The identification of the object 500 and determination of one or more dynamic characteristics allows the head-mounted device to provide one or more representations of the object, such as a visual and/or virtual rendering that represents the object 500. For example, the head-mounted device can provide a representation of the object 500 to the user via the display thereof. Such representations can include any information relating to the object 500 and/or the characteristic, such as labels, textual indications, graphical features, and/or other information. Additionally or alternatively, a representation can include a virtual object displayed on the display as a substitute for the physical object 500. As such, identified objects 500 from a physical environment can be replaced and/or augmented with virtual objects. The user can then interact (e.g., tactilely) with the object 500 in the external environment based on the virtual representation of the object provided by the head-mounted device.

Figure 6:
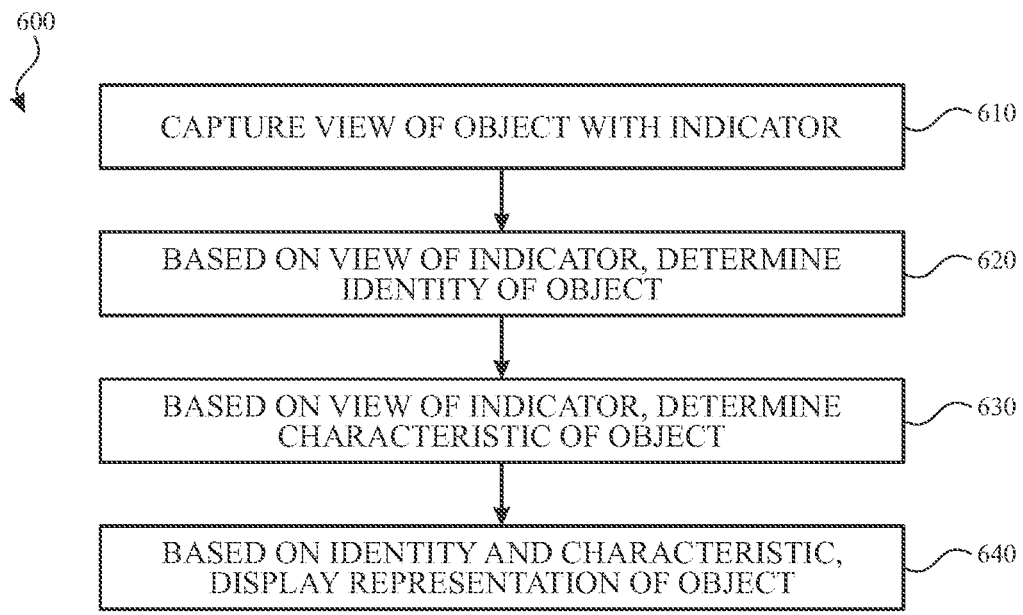
FIG. 6 illustrates a method of operating head-mounted devices to determine an identity and characteristic of an input device based on the indicators, in accordance with some embodiments of the present disclosure.

Referring now to FIG. 6, a method of operating a system including a head-mounted device is provided to achieve the results described herein. The method 600 can be performed at least in part by a head-mounted device to determine an identity and characteristic of an object. Additionally or alternatively, at least some steps can be performed in part by another device operatively connected to the head-mounted device. It will be understood that the method 600 illustrated in FIG. 6 is merely an example, and that a method can be performed with additional steps and/or fewer steps than those illustrated in FIG. 6.

In operation 610, a head-mounted device captures one or more views of an object, including indicators provided by the object. In operation 620, the head-mounted device determines (e.g., with a processor), based on the view of the object and/or the indicators, an identity of the object. The identity can include a static feature (e.g., size, shape, color, and the like) of the object. In operation 630, the head-mounted device determines (e.g., with a processor), based on the view of the object and/or the indicators, a characteristic of the object. The characteristic can include a dynamic characteristic (e.g., position, orientation, distance from the head-mounted device, configuration, state, and the like) of the object. In operation 640, the head-mounted device can display, based on the determined identity and the determined characteristic, a representation of the object. The representation can include a visual and/or virtual representation of the object that can be output on a display of the head-mounted device for observation by the user.

Figure 7:
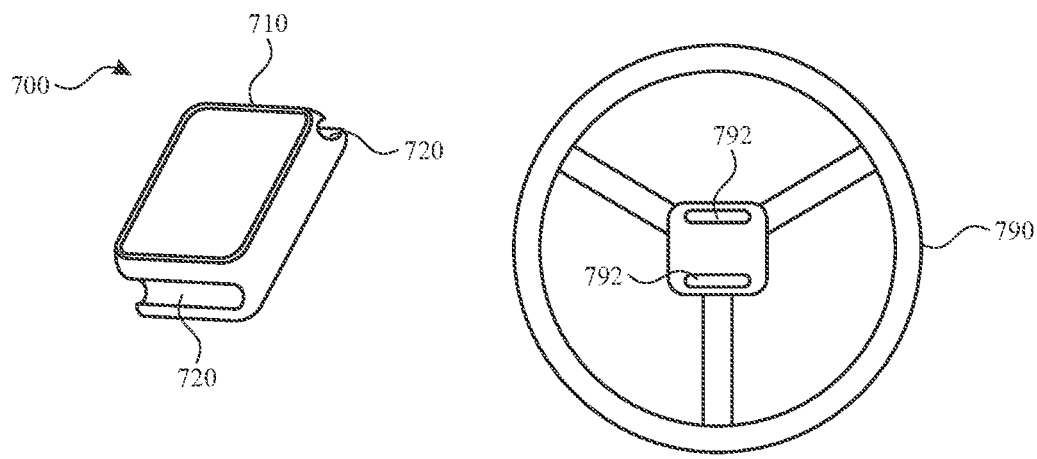
FIG. 7 illustrates a perspective view of an electronic device and a personal device, in accordance with some embodiments of the present disclosure.
Figure 8:
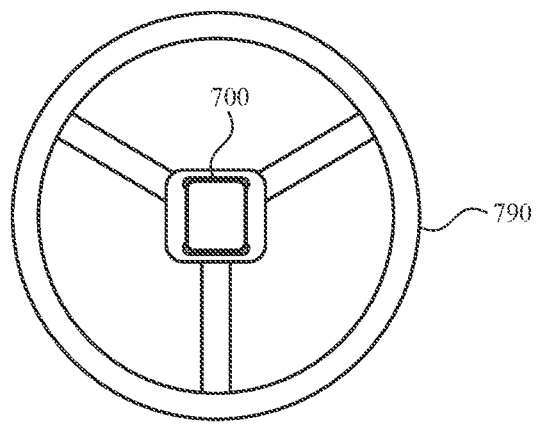
FIG. 8 illustrates a perspective view of an electronic device attached to a personal device, in accordance with some embodiments of the present disclosure.

Referring now to FIGS. 7 and 8, an electronic device can be attached to an object to facilitate determination of a characteristic thereof by a head-mounted device. The electronic device 700 of FIGS. 7 and 8 can correspond to the electronic device 50 of FIGS. 2 and 4, and the object 790 of FIGS. 7 and 8 can correspond to the object 90 of FIGS. 2 and 4. Additionally or alternatively, the electronic device 700 of FIGS. 7 and 8 can be represented visually by the head-mounted device as the electronic device 450 of FIG. 4, and the object 790 of FIGS. 7 and 8 can be represented visually by the head-mounted device as the object 490 of FIG. 4.

The electronic device 700 can include any electronic device that is detectable by a head-mounted device. For example, the electronic device 700 can be an input device for operation by a user. While the electronic device 700 is shown as a smartwatch (e.g., without wrist bands), it will be understood that other types of electronic devices are contemplated, such as a phone, a tablet computing device, a mobile computing device, a laptop computing device, a game controller, a stylus, a digital media player, wearable device (clothing, gloves, shoes, jewelry, apparel, and the like), a display, a television, and the like. It will be understood that the electronic device 700 can serve purposes and provide functions other than detectability by a head-mounted device. As such, the electronic device 700 can be a device that provides a set of functions when used with the object 790 and another set of functions when not used with the object 790.

The object 790 can be any object that is capable of being represented (e.g., visually) by the head-mounted device. For example, the object 790 can be any object in an external environment for representation by the head-mounted device in a virtual environment. Additionally or alternatively, the object 790 can be any object that can be operated and/or manipulated by a user. While the object 790 is shown as a controller (e.g., steering wheel), it will be understood that other types of objects are contemplated, such as a tool, an instrument, a sporting goods equipment item, a game controller, and the like. Such items can be held and/or manipulated by a user during use. For example, the position, orientation, movement, and/or other manipulation of the object 790 in space can be interpreted as a user input. Additionally or alternatively, the object 790 can be an input device. For example, the object 790 can be a keyboard, a trackpad, a mouse, a trackball, a game controller, a remote control, a stylus, a joystick, and the like. Such items can be held and/or manipulated by a user during use. For example, the user can operate an input component of the object 790 in a manner that is interpreted as an input.

As shown in FIG. 7, the electronic device 700 can include an electronic device attachment element 720, and the object 790 can include an object attachment element 792. The electronic device 700 can be releasably attached to the object 790 via the electronic device attachment element 720 and the object attachment element 792. While attached to each other, the electronic device 700 and the object 790 can maintain fixed relative positions and orientations. Accordingly, the position and/or orientation of the electronic device 700 can be used to determine the position and/or orientation of the object 790 based on the known spatial relationship between the electronic device 700 and the object 790 while attached to each other.

As an example of an attachment mechanism, the object attachment element 792 of the object 790 can be laterally or otherwise inserted into the electronic device attachment element 720 (e.g., a channel) of the electronic device 700. As such, the object 790 can be configured to slide relative to the electronic device 700. Additionally or alternatively, the object attachment element 792 can be pressed, snap fit or otherwise forwardly inserted into the electronic device attachment element 720. Once inserted, the object attachment element 792 can be locked or otherwise secured within the electronic device attachment element 720.

Additional or alternative mechanisms can be provided to lock the object 790 in place with respect to the electronic device 700. For example, mechanisms such as locks, latches, snaps, screws, clasps, threads, magnets, pins, an interference (e.g., friction) fit, knurl presses, bayoneting, and/or combinations thereof can be included to lock the object 790 to the electronic device 700 when the object attachment element 792 and the electronic device attachment element 720 engage each other. The object 790 can remain locked with respect to the electronic device 700 until a release mechanism is actuated. The release mechanism can be provided on an outer surface of the electronic device 700 and/or the object 790 for access by a user. Where a locking mechanism locks the object 790 in place with respect to the electronic device 700, the release mechanism, when actuated, can move and act upon the locking mechanism to cause it to release. For example, the release mechanism, when actuated, can release one or more locks, latches, snaps, screws, clasps, threads, magnets, pins, an interference (e.g., friction) fit, knurl presses, bayoneting, and/or combinations thereof that were previously locking the object 790 to the electronic device 700. At least some of the interactions between the release mechanism and a locking mechanism can be within the electronic device 700 and/or the object 790.

The electronic device 700 can include a housing 710 that defines at least a portion of an outer periphery of the electronic device 700. The housing 710 can support internal components of the electronic device 700 while providing an outer surface that is visible to an observer. The housing 710 can include a shape, color, surface feature, contour, and/or texture that is visually or otherwise detectable by a head-mounted device. Additionally or alternatively, the electronic device 700 can output (e.g., by a display) a feature that visually identifies the electronic device 700 to a head-mounted device. Additionally or alternatively, the electronic device 700 can include one or more indicators for identifying itself to a head-mounted device, such as those discussed herein. Features of the electronic device 700 can be detectable by a head-mounted device and recognizable by the head-mounted device as corresponding to a particular type of electronic device. As such, features of a given type of electronic device (e.g., make, model, style, etc.) can be different from features of a different type of electronic device. Accordingly, the features can be used as an identifier to allow a head-mounted device to identify the electronic device 700 as one of a type. Information regarding the type of object can then be retrieved and applied by the head-mounted device, for example for determination of a dynamic characteristic thereof and/or a visual representation thereof. For example, the features can be used to determine dynamic characteristics of the object, such as position, orientation, distance from the head-mounted device, configuration, state, and the like. It will be understood that such dynamic characteristics can change over time. As such, it can be useful to determine such characteristics so that information relating to the identity of the electronic device 700 can be applied in a manner that facilitates accurate representation (e.g., virtual rendering) of the electronic device 700 and/or the object 790 by the head-mounted device. Such representation can be updated repeatedly, periodically, or constantly based on updated detections of the indicators.

Where a feature of the electronic device 700 are located at a known portion of the electronic device 700 (e.g., on the housing 710), a head-mounted device can identify the location and/or orientation of each indicator to determine the location of the corresponding portion within a field of view of the head-mounted device. The relative positions of features within the field of view can also facilitate determination of the orientation of the electronic device 700 relative to the head-mounted device. The relative positions of the indicators within the field of view can also facilitate determination of a distance between the electronic device 700 and the head-mounted device. When a distance is known, the head-mounted device can also infer that other objects near the electronic device 700 are positioned at a similar distance.

The determination of one or more characteristics relating to the electronic device 700 can facilitate the determination of one or more characteristics of the object 790. For example, while attached to each other, the electronic device 700 and the object 790 can maintain fixed relative positions and orientations. Accordingly, the position and/or orientation of the electronic device 700 can be used to determine the position and/or orientation of the object 790 based on the known spatial relationship between the electronic device 700 and the object 790 while attached to each other. Accordingly, a determination of one or more characteristics relating to the object 790 can be achieved without direct observation of the object 790. Thus, the object 790 need to be provided with any features that facilitate direct detection and/or identification by a head-mounted device. Nonetheless, it will be understood that such features can optionally be provided for direct detection and/or identification. Additionally or alternatively, the object 790 need not be provided with any electronic components (e.g. input/output components, sensors, etc.) to facilitate operation by the user. Nonetheless, it will be understood that such features can optionally be provided for receiving inputs and/or performing detections at the object 790.

The identification of the electronic device 700 and determination of one or more dynamic characteristics thereof allows the head-mounted device to provide one or more representations of the electronic device 700 and/or the object 790, such as a visual and/or virtual rendering that represents the electronic device 700 and/or the object 790. For example, the head-mounted device can provide a representation of the electronic device 700 and/or the object 790 to the user via the display thereof. Such representations can include any information relating to the electronic device 700, the object 790 and/or characteristics thereof, such as labels, textual indications, graphical features, and/or other information. Additionally or alternatively, a representation can include a virtual item displayed on the display as a substitute for the physical electronic device 700 and/or the physical object 790. As such, an identified electronic device 700 and/or object 790 from a physical environment can be replaced and/or augmented with virtual items. The user can then interact (e.g., tactilely) with the electronic device 700 and/or the object 790 in the external environment based on the virtual representations provided by the head-mounted device.

It will be understood that representations of the object 790 can be provided without representations of the electronic device 700. For example, the head-mounted device can display a representation of the object 790 without displaying a representation of the electronic device 700. Accordingly, determinations required to display a representation of the object 790 can be based entirely on observations of the electronic device 700. The representations need not include a representation of the electronic device 700, upon which the displayed representations can be based.

A head-mounted device can be operated to perform gesture recognition. For example, data can be captured, processed, and/or generated by a head-mounted device where the data includes captured views of an electronic device 700 and/or an object 790. Gesture recognition can involve the detection of a position, orientation, and/or motion of the object 790 as achieved by a user during operation of the object 790. As discussed herein, such determinations can be based on the detections of the electronic device 700, even when the user is directly interacting with the object 790, rather than the electronic device 700. The user's operation of the object 790 can be interpreted as a user input for processing and response by the head-mounted device. For example, a particular one, series, and/or sequence of positions, orientations, and/or motions of the object 790 can be interpreted as a user input, and the head-mounted device can execute an action in response.

Figure 9:
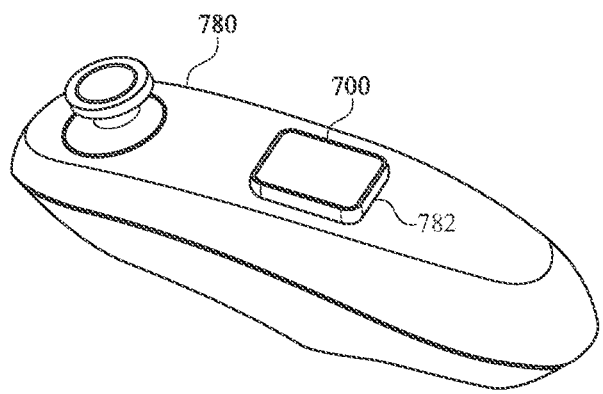
FIG. 9 illustrates a perspective view of an electronic device attached to a personal device, in accordance with some embodiments of the present disclosure.

Referring now to FIG. 9, another object 780 is shown in use with the electronic device 700. The electronic device 700 of FIG. 9 can correspond to the electronic device 50 of FIGS. 2 and 4 and the object 780 of FIG. 9 can correspond to the object 90 of FIGS. 2 and 4. Additionally or alternatively, the electronic device 700 of FIG. 9 can be represented visually by the head-mounted device as the electronic device 450 of FIG. 4, and the object 780 of FIG. 9 can be represented visually by the head-mounted device as the object 490 of FIG. 4.

While the object 780 is shown in FIG. 9 as a controller (e.g., game controller), it will be understood this is yet another example and that a variety of objects can be used, as discussed herein. As shown in FIG. 9, the object 780 can include an object attachment element 782 for releasably engaging the electronic device 700, as discussed herein. The determination of one or more characteristics relating to the electronic device 700 can facilitate the determination of one or more characteristics of the object 780. The head-mounted device can display a representation of the object 790 and/or the electronic device 700. The user's operation of the object 780 can be interpreted as a user input for processing and response by the head-mounted device.

Figure 10:
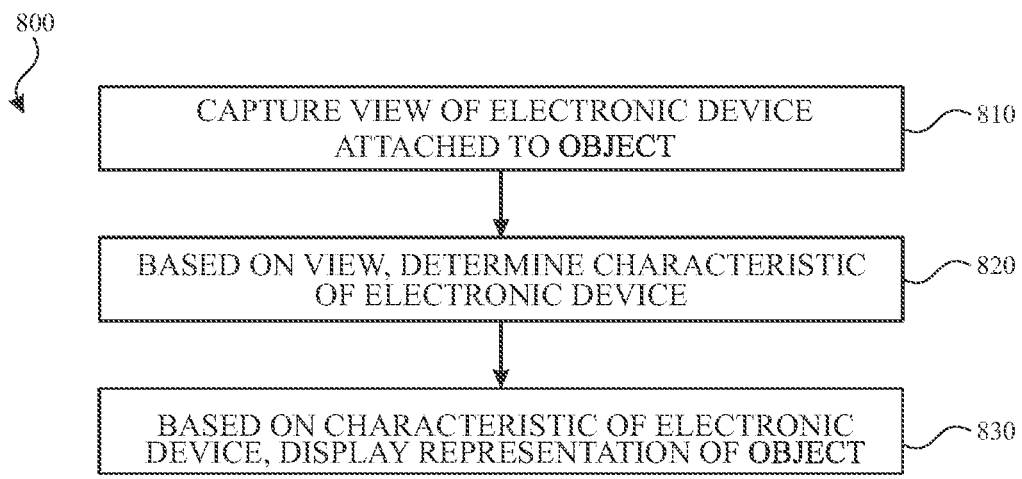
FIG. 10 illustrates a method of operating head-mounted devices to determine a characteristic of an electronic device and display a representation of a personal device attached to the electronic device, in accordance with some embodiments of the present disclosure.

Referring now to FIG. 10, a method of operating a system including a head-mounted device are provided to achieve the results described herein. The method 800 can be performed at least in part by a head-mounted device to determine an identity and characteristic of an electronic device and/or an object. Additionally or alternatively, at least some steps can be performed in part by another device operatively connected to the head-mounted device. It will be understood that the method 800 illustrated in FIG. 10 is merely an example, and that a method can be performed with additional steps and/or fewer steps than those illustrated in FIG. 10.

In operation 810, a head-mounted device captures one or more views of an electronic device that is attached to an object. The head-mounted device can optionally determine (e.g., with a processor), based on the view of the electronic device, an identity of the electronic device, and/or the identity can be determined based on user input and/or other inputs. The identity can include a static feature (e.g., size, shape, color, and the like) of the electronic device. In operation 820, the head-mounted device determines (e.g., with a processor), based on the view of the electronic device, a characteristic of the electronic device. The characteristic can include a dynamic characteristic (e.g., position, orientation, distance from the head-mounted device, configuration, state, and the like) of the electronic device. In operation 840, the head-mounted device can determine (e.g., with a processor) and display, based on the determined characteristic and/or a known spatial relationship between the electronic device and the object, a representation of the object. The representation can include a visual and/or virtual representation of the object that can be output on a display of the head-mounted device for observation by the user. Additionally or alternatively, the head-mounted device can determine (e.g., with a processor), based on the determined characteristic and/or a known spatial relationship between the electronic device and the object, a characteristic of the object and interpret the characteristic as a user input, as discussed herein.

Figure 11:
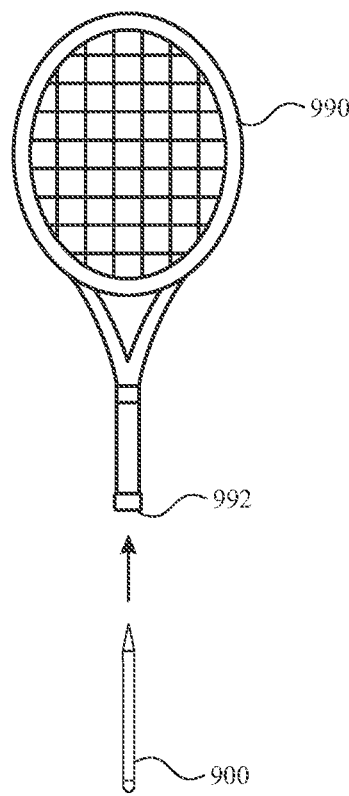
FIG. 11 illustrates a perspective view of an electronic device and a personal device, in accordance with some embodiments of the present disclosure.

Referring now to FIG. 11, an electronic device can be attached to an object to facilitate determination of a characteristic thereof by a head-mounted device. The electronic device 900 of FIG. 11 can correspond to the electronic device 50 of FIGS. 2 and 4, and the object 990 of FIG. 11 can correspond to the object 90 of FIGS. 2 and 4. Additionally or alternatively, the electronic device 900 of FIG. 11 can be represented visually by the head-mounted device as the electronic device 450 of FIG. 4, and the object 990 of FIG. 11 can be represented visually by the head-mounted device as the object 490 of FIG. 4.

The electronic device 900 can include any electronic device that is in communication with a head-mounted device. For example, the electronic device 900 can be an input device for operation by a user. While the electronic device 900 is shown as a stylus, it will be understood that other types of electronic devices are contemplated, such as a phone, a tablet computing device, a mobile computing device, a laptop computing device, a game controller, a watch, a digital media player, a wearable device (clothing, gloves, shoes, jewelry, apparel, and the like), a display, a television, and the like. It will be understood that the electronic device 900 can serve purposes and provide functions other than detectability by a head-mounted device. As such, the electronic device 900 can be a device that provides a set of functions when used with the object 990 and another set of functions when not used with the object 990.

The object 990 can be any object that is capable of being represented (e.g., visually) by the head-mounted device. For example, the object 990 can be any object in an external environment for representation by the head-mounted device in a virtual environment. Additionally or alternatively, the object 990 can be any object that can be operated and/or manipulated by a user. While the object 990 is shown as a sport equipment items (e.g., tennis racquet), it will be understood that other types of objects are contemplated, such as a tool, an instrument, a game controller, and the like. Such items can be held and/or manipulated by a user during use. For example, the position, orientation, movement, and/or other manipulation of the object 990 in space can be interpreted as a user input. Additionally or alternatively, the object 990 can be an input device. For example, the object 990 can be a keyboard, a trackpad, a mouse, a trackball, a game controller, a remote control, a stylus, a joystick, and the like. Such items can be held and/or manipulated by a user during use. For example, the user can operate an input component of the object 990 in a manner that is interpreted as an input.

As shown in FIG. 11, the object 990 can include an object attachment element 992. The electronic device 900 can be releasably attached to the object 990 via the object attachment element 992 (and/or a feature of the electronic device, such as an electronic device attachment element). While attached to each other, the electronic device 900 and the object 990 can maintain fixed relative positions and orientations. Accordingly, the position and/or orientation of the electronic device 900 can be used to determine the position and/or orientation of the object 990 based on the known spatial relationship between the electronic device 900 and the object 990 while attached to each other.

As an example of an attachment mechanism, the object attachment element 992 of the object 990 can receive at least a portion of the electronic device 900. As such, the object 990 can contain and/or protect the electronic device 900. Optionally, the electronic device 900 need not be visible when attached to the object 990. Additional or alternative mechanisms can be provided to lock the object 990 in place with respect to the electronic device 900. For example, mechanisms such as locks, latches, snaps, screws, clasps, threads, magnets, pins, an interference (e.g., friction) fit, knurl presses, bayoneting, and/or combinations thereof can be included to lock the object 990 to the electronic device 900. The object 990 can remain locked with respect to the electronic device 900 until a release mechanism is actuated. The release mechanism can be provided on an outer surface of the electronic device 900 and/or the object 990 for access by a user. Where a locking mechanism locks the object 990 in place with respect to the electronic device 900, the release mechanism, when actuated, can move and act upon the locking mechanism to cause it to release. For example, the release mechanism, when actuated, can release one or more locks, latches, snaps, screws, clasps, threads, magnets, pins, an interference (e.g., friction) fit, knurl presses, bayoneting, and/or combinations thereof that were previously locking the object 990 to the electronic device 900. At least some of the interactions between the release mechanism and a locking mechanism can be within the electronic device 900 and/or the object 990.

The electronic device 900 can sense a characteristic thereof and communicate corresponding data to the head-mounted device. For example, the electronic device 900 can include an inertial measurement unit ("IMU"), as discussed with respect to the electronic device 50 of FIG. 3. Accordingly, the electronic device 900 can detect and communicate a characteristic of the electronic device 900, such as position, orientation, velocity, and/or acceleration. Such detections can be provided by a sensor, such as an IMU including one or more of an accelerometer, a gyroscope, and/or a magnetometer. It will be understood that other detection mechanisms for detecting motion characteristics of the electronic device 900 can be provided.

Additionally or alternatively, the electronic device 900 can include one or more environment sensors, as discussed with respect to the electronic device 50 of FIG. 3. For example, an environment sensor can include a camera, an imaging device, a thermal sensor, a proximity sensor, a motion sensor, a humidity sensor, a chemical sensor, a light sensor, an audio sensor (e.g., microphone), and/or a UV sensor. An environment sensor can be configured to sense substantially any type of characteristic such as, but not limited to, images, pressure, light, touch, force, temperature, position, motion, sound, and so on. For example, the environment sensor 360 may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment.

Detections made by the electronic device 900 can be communicated to the head-mounted device, as discussed with respect to the electronic device 50 and the head-mounted device 100 of FIG. 3. For example, the detections can be communicated and used to determine dynamic characteristics of the object 990, such as position, orientation, distance from the head-mounted device, configuration, state, and the like. It will be understood that such dynamic characteristics can change over time. As such, it can be useful to detect and communicate such characteristics so that information relating to the electronic device 900 and/or the object 990 can be applied in a manner that facilitates accurate representation (e.g., virtual rendering) of the electronic device 900 and/or the object 990 by the head-mounted device.

The determination of one or more characteristics relating to the electronic device 900 can facilitate the determination of one or more characteristics of the object 990. For example, while attached to each other, the electronic device 900 and the object 990 can maintain fixed relative positions and orientations. Accordingly, the position and/or orientation of the electronic device 900 can be used to determine the position and/or orientation of the object 990 based on the known spatial relationship between the electronic device 900 and the object 990 while attached to each other. Accordingly, a determination of one or more characteristics relating to the object 990 can be achieved without direct observation of the object 990. Thus, the object 990 need to be provided with any features that facilitate direct detection and/or identification by a head-mounted device. Nonetheless, it will be understood that such features can optionally be provided for direct detection and/or identification. Additionally or alternatively, the object 990 need not be provided with any electronic components (e.g. input/output components, sensors, etc.) to facilitate operation by the user. Nonetheless, it will be understood that such features can optionally be provided for receiving inputs and/or performing detections at the object 990.

It will be understood that detected characteristics that are communicated from the electronic device 900 to the head-mounted device can be combined with detections made by the head-mounted device, such as detections based on a field of view of the head-mounted device. Such information can be combined by the head-mounted device and applied thereby. Other detections by the head-mounted device can also be included, such as detections of an emission from the electronic device 900. For example, the electronic device 900 can emit light or another emission that is detected by the head-mounted device. Such detections can be used to infer the direction in which the electronic device 900 is facing and/or features of a surface onto which the emitted light is projected.

The identification of the electronic device 900 and determination of one or more dynamic characteristics thereof allows the head-mounted device to provide one or more representations of the electronic device 900 and/or the object 990, such as a visual and/or virtual rendering that represents the electronic device 900 and/or the object 990. For example, the head-mounted device can provide a representation of the electronic device 900 and/or the object 990 to the user via the display thereof. Such representations can include any information relating to the electronic device 900, the object 990 and/or characteristics thereof, such as labels, textual indications, graphical features, and/or other information. Additionally or alternatively, a representation can include a virtual item displayed on the display as a substitute for the physical electronic device 900 and/or the physical object 990. As such, an identified electronic device 900 and/or object 990 from a physical environment can be replaced and/or augmented with virtual items. The user can then interact (e.g., tactilely) with the electronic device 900 and/or the object 990 in the external environment based on the virtual representations provided by the head-mounted device.

It will be understood that representations of the object 990 can be provided without representations of the electronic device 900. For example, the head-mounted device can display a representation of the object 990 without displaying a representation of the electronic device 900. Accordingly, determinations required to display a representation of the object 990 can be based entirely on observations of the electronic device 900. The representations need not include a representation of the electronic device 900, upon which the displayed representations can be based.

A head-mounted device can be operated to perform gesture recognition. For example, data can be captured, processed, and/or generated by a head-mounted device where the data includes captured views of an electronic device 900 and/or an object 990. Gesture recognition can involve the detection of a position, orientation, and/or motion of the object 990 as achieved by a user during operation of the object 990. As discussed herein, such determinations can be based on the detections of the electronic device 900, even when the user is directly interacting with the object 990, rather than the electronic device 900. The user's operation of the object 990 can be interpreted as a user input for processing and response by the head-mounted device. For example, a particular one, series, and/or sequence of positions, orientations, and/or motions of the object 990 can be interpreted as a user input, and the head-mounted device can execute an action in response.

Figure 12:
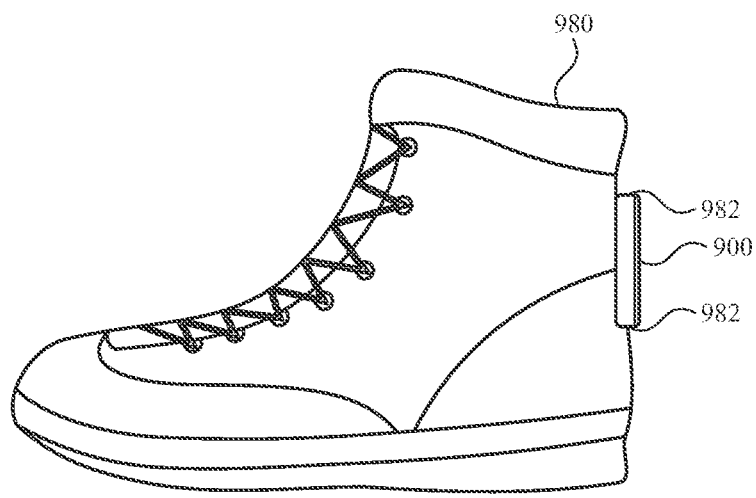
FIG. 12 illustrates a perspective view of an electronic device attached to a personal device, in accordance with some embodiments of the present disclosure.

Referring now to FIG. 12 another object 980 is shown in use with the electronic device 900. The electronic device 900 of FIG. 12 can correspond to the electronic device 50 of FIGS. 2 and 4, and the object 980 of FIG. 12 can correspond to the object 90 of FIGS. 2 and 4. Additionally or alternatively, the electronic device 900 of FIG. 12 can be represented visually by the head-mounted device as the electronic device 450 of FIG. 4, and the object 980 of FIG. 12 can be represented visually by the head-mounted device as the object 490 of FIG. 4.

While the object 980 is shown in FIG. 12 as a shoe, it will be understood this is yet another example and that a variety of objects can be used, as discussed herein. As shown in FIG. 12 the object 980 can include one or more object attachment elements 982 for releasably engaging the electronic device 900, as discussed herein. The determination of one or more characteristics relating to the electronic device 900 can facilitate the determination of one or more characteristics of the object 980. The head-mounted device can display a representation of the object 990 and/or the electronic device 900. The user's operation of the object 980 can be interpreted as a user input for processing and response by the head-mounted device.

Figure 13:
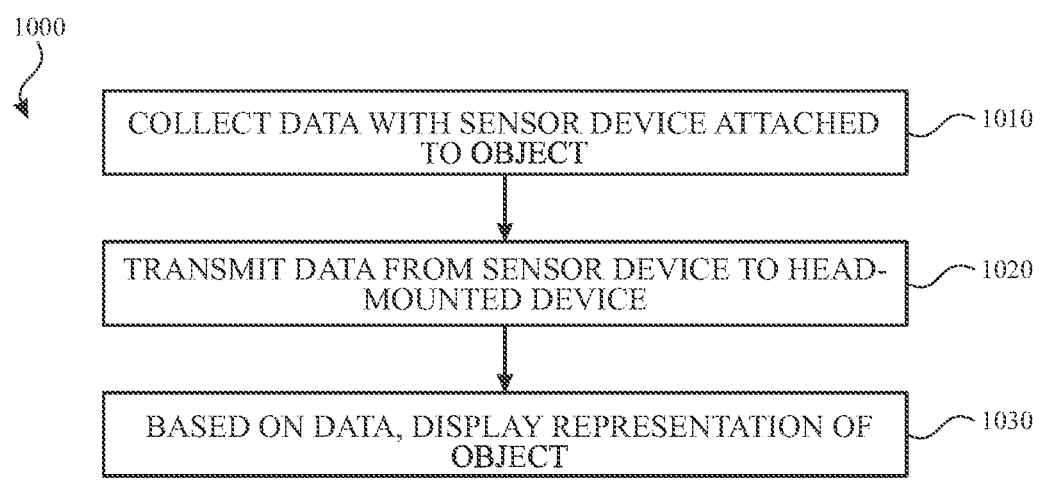
FIG. 13 illustrates a method of operating head-mounted devices to collect data from a sensor device and display a representation of a personal device attached to the sensor device, in accordance with some embodiments of the present disclosure.

Referring now to FIG. 13, a method of operating a system including a head-mounted device are provided to achieve the results described herein. The method 1000 can be performed at least in part by a head-mounted device and/or an electronic device to determine a characteristic of an electronic device and/or an object. Additionally or alternatively, at least some steps can be performed in part by another device operatively connected to the head-mounted device. It will be understood that the method 1000 illustrated in FIG. 13 is merely an example, and that a method can be performed with additional steps and/or fewer steps than those illustrated in FIG. 13.

In operation 1010, as a sensor (e.g., IMU, environmental sensor, camera, etc.) of an electronic device is operated to make detections and/or collect data relating to a characteristic of the electronic device. The characteristic can include a dynamic characteristic (e.g., position, orientation, distance from the head-mounted device, configuration, state, and the like) of the electronic device. The data can be collected while the electronic device is attached to an object. In operation 1020, the data from the sensor is transmitted from the electronic device to the head-mounted device. In operation 1030, the head-mounted device can determine (e.g., with a processor) and display, based on the data (e.g., indicating a determined characteristic) and/or a known spatial relationship between the electronic device and the object, a representation of the object. The representation can include a visual and/or virtual representation of the object that can be output on a display of the head-mounted device for observation by the user. Additionally or alternatively, the head-mounted device can determine (e.g., with a processor), based on the determined characteristic and/or a known spatial relationship between the electronic device and the object, a characteristic of the object and interpret the characteristic as a user input, as discussed herein.

Accordingly, embodiments of the present disclosure provide a system including a head-mounted device another device and/or object for which information is gathered to facilitate visual display of a representation thereof. An object can be provided with indicators that allow a head-mounted device to determine both an identity and a characteristic (e.g., position, orientation, distance, etc.) of the object. Additionally or alternatively, the head-mounted device can determine both an identity and a characteristic (e.g., position, orientation, distance, etc.) of an electronic device attached to an object for producing a virtual representation of the object. Additionally or alternatively, the head-mounted device can receive data from an electronic device attached to an object for producing a virtual representation of the object. The virtual representation of the object can resemble the physical object, even where the object itself is not independently analyzed.

Various examples of aspects of the disclosure are described below as clauses for convenience. These are provided as examples, and do not limit the subject technology.

Clause A: a system comprising: an object for operation by a user, the object comprising indicators on an outer surface of the object; and a head-mounted device comprising: a camera for capturing a view of the indicators; a processor configured to determine, based on the view of the indicators, an identity of the object and a characteristic of the object; and a display configured to show a representation of the object based on the identity of the object and the characteristic of the object.

Clause B: a head-mounted device comprising: a camera for capturing a view of: an object for being held or worn by a user; an electronic device releasably coupled to the object such that the electronic device maintains a fixed position and orientation with respect to the object; a processor configured to determine a characteristic of the electronic device based on the view of the electronic device; and a display configured to show a representation of the object based on the characteristic and a known spatial relationship between the electronic device and the object.

Clause C: a head-mounted device comprising: a communication element configured to receive, from an electronic device, a characteristic detected by a sensor of the electronic device while the electronic device is releasably coupled to an object such that the electronic device maintains a fixed position and orientation with respect to the object; and a processor configured to determine, based on the characteristic of the electronic device and a known spatial relationship between the electronic device and the object, a characteristic of the object; and a display configured to show a representation of the object based on the characteristic of the object.

Clause D: a system comprising: one or more of the head-mounted devices of clause A, B, or C.

One or more of the above clauses can include one or more of the features described below. It is noted that any of the following clauses may be combined in any combination with each other, and placed into a respective independent clause, e.g., clause A, B, C, or D.

Clause 1: the processor is further configured to determine the characteristic of the object based on a location and orientation of the indicators within the view of the indicators and a known spatial relationship between or among the indicators.

Clause 2: the object is selected from the group consisting of: a keyboard, a trackpad, a mouse, a trackball, a game controller, a remote control, a stylus, and a joystick.

Clause 3: the characteristic is a dynamic characteristic comprising a position, an orientation, or a distance from the head-mounted device.

Clause 4: the representation comprises a virtual object that replaces the object in a view provided by the display of the head-mounted device.

Clause 5: the processor is further configured to determine the characteristic of the electronic device by: determining an identity of the electronic device based on the view of the electronic device; determining a static feature of the electronic device based on the identity of the electronic device; and determining the characteristic of the electronic device based on the view of the electronic device, wherein the view includes the static feature.

Clause 6: the static feature comprises a size, a shape, or a color of the electronic device.

Clause 7: the electronic device is selected from the group consisting of: a smartwatch, a phone, a tablet computing device, a stylus, and a digital media player.

Clause 8: the processor is further configured to: detect a user input based on the characteristic and the known spatial relationship between the electronic device and the object; and execute an action corresponding to the user input.

Clause 9: the object comprising a first attachment element; and the electronic device comprising a second attachment element for releasably engaging the first attachment element of the object.

Clause 10: the electronic device is selected from the group consisting of: a smartwatch, a phone, a tablet computing device, a stylus, and a digital media player.

Clause 11: the processor is further configured to: detect a user input based on the characteristic of the object; and execute an action corresponding to the user input.

Clause 12: the communication element is a first communication element; the object comprising a first attachment element; and the electronic device comprising: the sensor; a second attachment element for releasably engaging the first attachment element of the object; and a second communication element for transmitting the characteristic to the first communication element of the head-mounted device.

Clause 13: the electronic device further comprises a light emitter configured to project light onto a surface; and the head-mounted device further comprises a camera for capturing a view of the electronic device and the light projected onto the surface, wherein the representation of the object is further based on the view of the electronic device and the light projected onto the surface.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A system comprising:
   an object for operation by a user, the object comprising indicators on an outer surface of the object; and
   a head-mounted device comprising:
   a camera for capturing a view of the indicators;
   a processor configured to:
   determine, based on the view of the indicators, an identity of the object;
   retrieve, based on the identity of the object, static features of the object, the static features comprising a shape and a color of the object; and
   determine, based on the view of the indicators, dynamic characteristics of the object, the dynamic characteristics comprising a position and an orientation of the object; and
   a display configured to show a visual representation of the object based on the static features and the dynamic characteristics.

2. The system of claim 1, wherein the processor is further configured to determine the dynamic characteristics of the object based on a location and orientation of the indicators within the view of the indicators and a known spatial relationship between or among the indicators.

3. The system of claim 1, wherein the object is selected from the group consisting of: a keyboard, a trackpad, a mouse, a trackball, a game controller, a remote control, a stylus, and a joystick.

4. The system of claim 1, wherein the dynamic characteristics further comprise a distance of the object from the head-mounted device.

5. The system of claim 1, wherein the visual representation comprises a virtual object at a position of the display corresponding to a position of the object in the view captured by the camera.

6. A head-mounted device comprising:
   a camera for capturing a view of:
   an object for being held or worn by a user; and
   an electronic device releasably coupled to the object such that the electronic device maintains a fixed position and orientation with respect to the object;
   a processor configured to determine a characteristic of the electronic device based on the view of the electronic device by:
   determining an identity of the electronic device based on the view of the electronic device;
   determining a static feature of the electronic device based on the identity of the electronic device; and
   determining the characteristic of the electronic device based on the view of the electronic device, wherein the view includes the static feature; and
   a display configured to show a representation of the object based on the characteristic and a known spatial relationship between the electronic device and the object.

7. The head-mounted device of claim 6, wherein the static feature comprises a size, a shape, or a color of the electronic device.

8. The head-mounted device of claim 6, wherein the electronic device is selected from the group consisting of: a smartwatch, a phone, a tablet computing device, a stylus, and a digital media player.

9. The head-mounted device of claim 6, wherein the characteristic is a dynamic characteristic comprising a position, an orientation, or a distance from the head-mounted device.

10. The head-mounted device of claim 6, wherein the representation comprises a virtual object at a position of the display corresponding to a position of the object in the view captured by the camera.

11. The head-mounted device of claim 6, wherein the processor is further configured to:
    detect a user input based on the characteristic and the known spatial relationship between the electronic device and the object; and
    execute an action corresponding to the user input.

12. A system comprising:
    the head-mounted device of claim 6;
    the object comprising a first attachment element; and
    the electronic device comprising a second attachment element for releasably engaging the first attachment element of the object.

13. A head-mounted device comprising:
    a communication element configured to receive, from an electronic device, a characteristic detected by a sensor of the electronic device while the electronic device is releasably coupled to an object such that the electronic device maintains a fixed position and orientation with respect to the object;
    a processor configured to determine, based on the characteristic of the electronic device and a known spatial relationship between the electronic device and the object, a characteristic of the object; and
    a display configured to show a representation of the object based on the characteristic of the object.

14. The head-mounted device of claim 13, wherein the electronic device is selected from the group consisting of: a smartwatch, a phone, a tablet computing device, a stylus, and a digital media player.

15. The head-mounted device of claim 13, wherein the characteristic of the electronic device is a dynamic characteristic comprising a position, an orientation, or a distance from the head-mounted device.

16. The head-mounted device of claim 13, wherein the representation comprises a virtual object at a position of the display corresponding to a position of the object in the view captured by the camera.

17. The head-mounted device of claim 13, wherein the processor is further configured to:
    detect a user input based on the characteristic of the object; and
    execute an action corresponding to the user input.

18. A system comprising:
    the head-mounted device of claim 13, wherein the communication element is a first communication element;
    the object comprising a first attachment element; and
    the electronic device comprising:
        the sensor;
        a second attachment element for releasably engaging the first attachment element of the object; and
        a second communication element for transmitting the characteristic to the first communication element of the head-mounted device.

19. The system of claim 18, wherein:
    the electronic device further comprises a light emitter configured to project light onto a surface; and
    the head-mounted device further comprises a camera for capturing a view of the electronic device and the light projected onto the surface, wherein the representation of the object is further based on the view of the electronic device and the light projected onto the surface.

* * * * *